US011909886B2

(12) United States Patent
Meng et al.

(10) Patent No.: US 11,909,886 B2
(45) Date of Patent: Feb. 20, 2024

(54) METHOD, APPARATUS FOR BLOCKCHAIN-BASED MULTI-PARTY COMPUTATION, DEVICE AND MEDIUM

(71) Applicant: BEIJING BAIDU NETCOM SCIENCE AND TECHNOLOGY CO., LTD., Beijing (CN)

(72) Inventors: Yang Meng, Beijing (CN); Haodong Chen, Beijing (CN); Yuxiao Song, Beijing (CN); Hui Wang, Beijing (CN); Xiangmin Li, Beijing (CN); Jingqi Cao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 470 days.

(21) Appl. No.: 17/145,121

(22) Filed: Jan. 8, 2021

(65) Prior Publication Data
US 2021/0218576 A1 Jul. 15, 2021

(30) Foreign Application Priority Data
Jan. 10, 2020 (CN) .......................... 202010026601.5

(51) Int. Cl.
*H04L 9/32* (2006.01)
*H04L 9/06* (2006.01)
(Continued)

(52) U.S. Cl.
CPC .......... *H04L 9/3239* (2013.01); *H04L 9/0618* (2013.01); *H04L 9/0643* (2013.01);
(Continued)

(58) Field of Classification Search
CPC ... H04L 9/3247; H04L 9/0643; H04L 9/3239; H04L 9/0618; H04L 9/50; H04L 63/123;
(Continued)

(56) References Cited

U.S. PATENT DOCUMENTS 9,830,467 B1 * 11/2017 Harold ................. H04L 9/0656
10,721,058 B2 * 7/2020 Housholder ............ G06F 21/64
(Continued)

FOREIGN PATENT DOCUMENTS

CN      102202046 A      9/2011
CN      109241016 A      1/2019
(Continued)

OTHER PUBLICATIONS

European Extended Search Report for Application No. 21150982.3 dated Apr. 21, 2019.
(Continued)

*Primary Examiner* — Amare F Tabor
(74) *Attorney, Agent, or Firm* — Knobbe, Martens, Olson & Bear, LLP (57) ABSTRACT

Embodiments of the present disclosure provide methods and apparatuses for blockchain-based multi-party computation, a device and a medium, relate to blockchain technology in the field of computer technology. An embodiment of the method can include: encrypting business data, to obtain a ciphertext of the business data; hashing the ciphertext of the business data, to obtain a hash result of the business data; sending the hash result of the business data to a blockchain node, so that the blockchain node writes the hash result of the business data into a blockchain; and sending the ciphertext of the business data to a target trusted computing module in a target server, for instructing the target trusted computing module to perform multi-party computation based on the ciphertext of the business data and the hash result of the business data in the blockchain.

11 Claims, 6 Drawing Sheets

(51) Int. Cl.
*H04L 9/40* (2022.01)
*H04L 9/00* (2022.01)

(52) U.S. Cl.
CPC ........ *H04L 9/3247* (2013.01); *H04L 63/0428* (2013.01); *H04L 9/50* (2022.05)

(58) Field of Classification Search
CPC ............. H04L 63/0428; H04L 63/0435; H04L 2209/46; G06F 21/64
USPC ........................................................ 713/189
See application file for complete search history.

(56) References Cited

U.S. PATENT DOCUMENTS

| | | | | |
|---|---|---|---|---|
| 10,778,445 | B1* | 9/2020 | Feng | H04L 9/0637 |
| 10,785,033 | B2* | 9/2020 | Karame | G06F 21/6245 |
| 10,839,391 | B2* | 11/2020 | Madhu | H04L 9/3228 |
| 11,196,569 | B2* | 12/2021 | Bessonov | H04L 9/321 |
| 11,227,057 | B2* | 1/2022 | Irazabal | G06F 16/2308 |
| 11,294,881 | B2* | 4/2022 | Tian | G06F 3/0604 |
| 11,625,490 | B2* | 4/2023 | Li | H04L 9/0643 713/167 |
| 2005/0177518 | A1* | 8/2005 | Brown | G06Q 20/10 705/64 |
| 2007/0288472 | A1* | 12/2007 | Rivera | G06Q 20/20 |
| 2017/0318008 | A1* | 11/2017 | Mead | H04L 63/0861 |
| 2020/0004973 | A1 | 1/2020 | Li et al. | |
| 2020/0084027 | A1* | 3/2020 | Duchon | G06F 21/602 |

FOREIGN PATENT DOCUMENTS

| | | |
|---|---|---|
| CN | 109660358 A | 4/2019 |
| JP | 2019-176264 A | 10/2019 |
| JP | 2020-021048 A | 2/2020 |
| KR | 20130085491 | 7/2013 |
| KR | 20190081299 | 7/2019 |

OTHER PUBLICATIONS

Gao, et al., "BFR-MPC: A Blockchain-Based Fair and Robust Multi-Party Computation Scheme", IEEE, Access, Aug. 22, 2019, vol. 7, pp. 110439-110450, 12 pages.

Tiffany Hyun—"Jin Kim, SSP: Self-Sovereign Privacy for Internet of Things using Blockchain and MPC", 2019 IEEE International Conference on Blockchain, IEEE, Jul. 14, 2019, pp. 411-418, 8 pages.

Office Action of Japanese Patent Application No. 2021-002357, dated Dec. 21, 2021 in 5 pages.

* cited by examiner

Fig. 10

METHOD, APPARATUS FOR BLOCKCHAIN-BASED MULTI-PARTY COMPUTATION, DEVICE AND MEDIUM

CROSS-REFERENCE TO RELATED APPLICATIONS

This application claims priority to Chinese Patent Application No. 202010026601.5, filed with the China National Intellectual Property Administration (CNIPA) on Jan. 10, 2020, the content of which is incorporated herein by reference in its entirety.

TECHNICAL FIELD

Embodiments of the present disclosure relate to the field of computer technology, specifically to blockchain technology, and more specifically to a method and apparatus for blockchain-based multi-party computation, a device and a medium.

BACKGROUND

Blockchain is a new application mode of computer technology such as distributed data storage, point-to-point transmission, consensus mechanism, and encryption algorithm. A distributed transaction processing of the blockchain generally involves transaction processing by a block generation node.

With the rapid development of Internet technology, companies need to share data. While sharing data between companies, how to protect the safety of data is very important.

In order to improve the credibility (i.e., reliability) of sharing data, blockchain may be used to store shared data. However, due to the openness of the blockchain, the safety of the data on the chain cannot be guaranteed.

SUMMARY

Embodiments of the present disclosure propose a method and apparatus for blockchain-based multi-party computation, a device and a medium. By providing a solution that takes into account the safety and reliability of multi-party computation data, it provides a condition for ensuring the safety and reliability of the data.

In a first aspect, some embodiments of the present disclosure provide a method for blockchain-based multi-party computation, executed by a participant device, the method comprises: encrypting business data, to obtain a ciphertext of the business data; hashing the ciphertext of the business data, to obtain a hash result of the business data; sending the hash result of the business data to a blockchain node, so that the blockchain node writes the hash result of the business data into a blockchain; and sending the ciphertext of the business data to a target trusted computing module in a target server, so that the target trusted computing module performs multi-party computation based on the ciphertext of the business data and the hash result of the business data in the blockchain.

Embodiments of the present disclosure, by encrypting the business data, and hashing the ciphertext of the business data obtained by the encryption to obtain the hash result of the business data, and sending the hash result of the business data to a blockchain node, so that the blockchain node writes the hash result of the business data into the blockchain, and sending the ciphertext of the business data to the trusted computing module in the target server, so that the trusted computing module performs multi-party computation based on the ciphertext of the business data and the hash result of the business data in the blockchain. Therefore, by providing a solution that takes into account the safety and reliability of multi-party computation data, it provides a foundation for ensuring the safety and reliability of the data.

In addition, the method for blockchain-based multi-party computation according to embodiments of the present disclosure may include following technical features:

Alternatively, before encrypting the business data to obtain the ciphertext of the business data, the method further comprises: determining a target random number by interacting with the target trusted computing module; encrypting a key using the target random number, to obtain a key ciphertext; sending the key ciphertext to the target trusted computing module, so that the target trusted computing module decrypts the key ciphertext using the target random number to obtain the key; and correspondingly, the encrypting the business data to obtain the ciphertext of the business data, comprises: encrypting the business data using the key to obtain the ciphertext of the business data.

An embodiment of the present disclosure may include following advantage and beneficial effect: by determining a target random number, and encrypting the key with the target random number, so that the key will not be leaked and safety of private data.

Alternatively, before sending the ciphertext of the business data to the target trusted computing module in the target server, the method further comprises: sending a server selection request to the blockchain node, wherein the server selection request comprises information of a target trusted computing algorithm; acquiring, from the blockchain node, registration information of candidate servers supporting the target trusted computing algorithm; and selecting the target server from the candidate servers, based on the registration information of the candidate servers.

Alternatively, the selecting the target server from the candidate servers, based on the registration information of the candidate servers, comprises: sending a request for attesting trusted computing environments of the candidate servers to a trusted computing attestation service, wherein the request for attesting the trusted computing environments comprises the registration information of the candidate servers, so that the trusted computing attestation service performs attestation on the trusted computing environments of the candidate servers; and selecting the target server from candidate servers passed through the attestation.

An embodiment of the present disclosure has following advantages and beneficial effect: by selecting the target server from the candidate servers which have passed the attestation, to improve the safety of the multi-party computation.

Alternatively, after sending the ciphertext of the business data to the target trusted computing module in the target server, the method further comprises: acquiring a ciphertext of a multi-party computation result from the target trusted computing module, wherein the ciphertext of the multi-party computation result is acquired by encrypting the multi-party computation result using the target random number; and decrypting the ciphertext of the multi-party computation result using the target random number, to acquire the multi-party computation result.

In a second aspect, some embodiments of the present disclosure provides a method for blockchain-based multi-party computation, executed by a server. The method comprises: receiving ciphertexts of business data sent from participant devices, the ciphertexts of the business data being obtained by encrypting the business data of the participant devices; acquiring hash results of the business data from the blockchain, the hash results of the business data being obtained by hashing the ciphertexts of the business data; and performing multi-party computation by a trusted computing module, based on the ciphertexts of the business data and the hash results of the business data to obtain a multi-party computation result.

In a third aspect, some embodiments of the present disclosure provide a method for blockchain-based multi-party computation, executed by a blockchain node, the method includes: receiving hash results of business data sent from participant devices, the hash results of the business data being obtained by hashing ciphertexts of the business data; and sending the hash results of the business data to a target trusted computing module in a target server, so that the target trusted computing module performs multi-party computation based on the received ciphertexts of the business data and the hash results of the business data.

In a fourth aspect, some embodiments of the present disclosure provides an apparatus for blockchain-based multi-party computation, configured in a participant device, the apparatus comprises: a data encryption module, configured to encrypt business data, to obtain a ciphertext of the business data; a hashing module, configured to hash the ciphertext of the business data, to obtain a hash result of the business data; a first sending module, configured to send the hash result of the business data to a blockchain node, so that the blockchain node writes the hash result of the business data into a blockchain; and a ciphertext sending module, configured to send the ciphertext of the business data to a target trusted computing module in a target server, for the target trusted computing module to perform multi-party computation based on the ciphertext of the business data and the hash result of the business data in the blockchain.

In a fifth aspect, some embodiments of the present disclosure provides an apparatus for blockchain-based multi-party computation, configured in a server, the apparatus comprises: a ciphertext receiving module, configured to receive ciphertexts of the business data sent from a participant devices, the ciphertexts of the business data being obtained by encrypting business data of the participant devices; a result acquisition module, configured to acquire hash results of the business data from the blockchain, the hash results of the business data being obtained by hashing the ciphertexts of the business data; and a multi-party computation module, configured to perform multi-party computation by a trusted computing module, based on the ciphertexts of the business data and the hash results of the business data to obtain a multi-party computation result.

In a sixth aspect, some embodiments of the present disclosure provide an apparatus for blockchain-based multi-party computation, configured in a blockchain node, the apparatus comprises: a result receiving module, configured to receive hash results of the business data sent from participant devices, the hash results of the business data being obtained by hashing ciphertexts of the business data; and a second sending module, configured to send the hash results of the business data to a target trusted computing module in a target server, so that the target trusted computing module performs multi-party computation based on the received ciphertexts of the business data and the hash results of the business data.

In a seventh aspect, some embodiments of the present disclosure provide an electronic device. The electronic device includes: at least one processor; and a memory, communicatively connected to the at least one processor; where the memory, storing instructions executable by the at least one processor, the instructions, when executed by the at least one processor, cause the at least one processor to perform any one of the methods for blockchain-based multi-party computation according to embodiments of the present disclosure.

In an eighth aspect, some embodiments of the present disclosure provide a non-transitory computer readable storage medium, storing computer instructions, the computer instructions, being used to cause the computer to perform any one of the methods for blockchain-based multi-party computation according to embodiments of the present disclosure.

Other effects of the above alternative implementations will be described below in conjunction with specific embodiments.

BRIEF DESCRIPTION OF THE DRAWINGS

The accompanying drawings are used to better understand the present solution and do not constitute a limitation to the present disclosure, in which.

DETAILED DESCRIPTION OF EMBODIMENTS

The following describes exemplary embodiments of the present disclosure in conjunction with the accompanying drawings, which includes various details of the embodiments of the present disclosure to facilitate understanding, and they should be considered as merely exemplary. Therefore, those of ordinary skill in the art should recognize that various changes and modifications may be made to the embodiments described herein without departing from the scope and spirit of the present disclosure. Also, for clarity and conciseness, descriptions of well-known functions and structures are omitted in the following description.

The following describes the method and apparatus for multi-party computation based on blockchain, a device and a medium disclosed in the embodiments of the present disclosure with reference to the accompanying drawings. First, taking an executing body as a participant device as an example, the method for multi-party computation based on blockchain disclosed in the embodiments of the present disclosure is described. The number of the participant device is at least two, and each participant device performs similar or identical operations.

In order to clearly illustrate, in the method for the blockchain-based multi-party computation according to embodiments of the present disclosure, a process in which a target server performs multi-party computation on a ciphertext (or chirp text) of the business data sent from the participant device, the following first describes selecting the target server in a blockchain node in the present embodiment of the disclosure.

Figure 1:
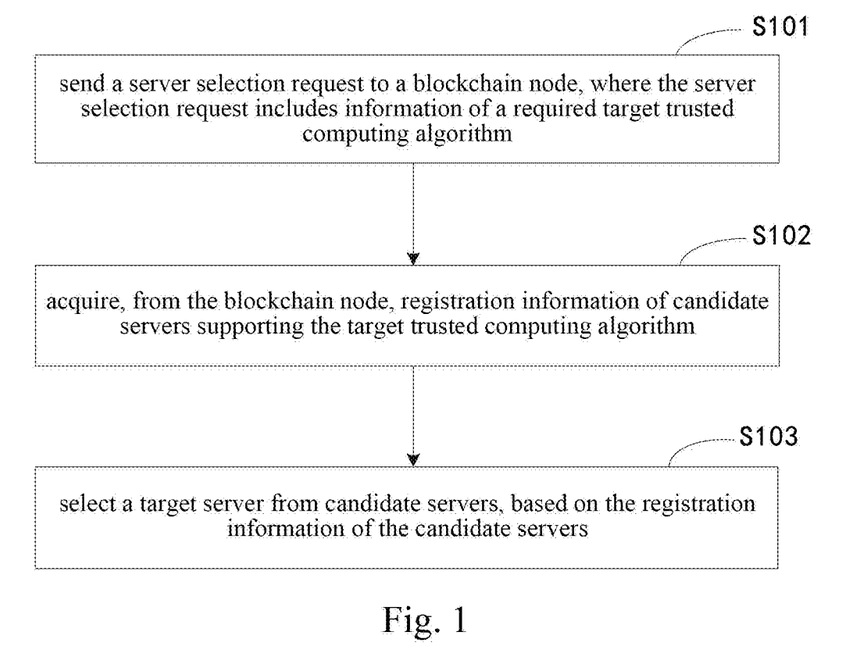
FIG. 1 is a schematic flowchart for selecting a target server according to an embodiment of the present disclosure.

FIG. 1 is a schematic flowchart for selecting a target server according to an embodiment of the present disclosure. Embodiments of the disclosure may be executed by the apparatus for blockchain-based multi-party computation, which may be implemented by software and/or hardware, and may be configured in the participant device. The method includes the following steps:

S101, sending a server selection request to a blockchain node, where the server selection request includes information of a required target trusted computing algorithm.

S102, acquiring registration information of candidate servers supporting the target trusted computing algorithm from the blockchain node.

Here, the information of the required target trusted computing algorithm may be the name of the trusted computing algorithm. In embodiments of the present disclosure, the trusted computing algorithm may be a linear regression algorithm or other algorithms, which is not specifically limited herein.

As a message bus between different servers (collaborators), a blockchain network has registration information of different servers. Then, when a participant device needs to perform multi-party computation, it may send a server selection request to a blockchain node in the blockchain network, so that the blockchain node selects a candidate server from a plurality of registered servers based on the server selection request.

The blockchain node receives the server selection request sent from the participant device, and acquires the information of a required target trusted computing algorithm included in the request by analyzing the server selection request. Then, based on the information of the target trusted computing algorithm, the blockchain node searches in the registration information of the plurality of servers for the servers that supports the above target trusted computing algorithm. If at least one server supports the target trusted computing algorithm, then the at least one server is used as candidate servers; if no server is capable of supporting the target trusted computing algorithm, a prompt message of no candidate server is sent to the participant device, so that the participant device may adjust the target trusted computing algorithm to reselect a server or end the selection operation.

Further, after candidate servers are determined, the blockchain node also sends the registration information of the candidate servers to the participant device, to lay a foundation for the participant device selecting a target server.

S103, selecting the target server from candidate servers, based on the registration information of the candidate servers.

As an example, after acquiring the registration information of the candidate servers sent from the blockchain node, the participant device may select the target server from the candidate servers based on the registration information of candidate servers.

As an implementation, the participant device may send a request for attesting trusted computing environments of the candidate servers to a trusted computing attestation service, such as the Intel Attestation Service, IAS, so that IAS performs attestation on the trusted computing environments of the candidate servers. Then, based on attestation results of the candidate servers fed back by IAS, a candidate server passed through the attestation is selected as the target server, where the request for attesting trusted computing environments includes the registration information of candidate servers. In the present embodiment of the disclosure, performing attestation on the candidate servers by IAS refers to attesting hardware information of the candidate servers.

It should be noted that, IAS provides SGX attestation service for Intel, the service may be used to verify whether a program is running on an SGX hardware environment and/or whether the program has been tampered.

That is, the selecting the target server from candidate servers based on the registration information of candidate servers includes: sending a request for attesting trusted computing environments of the candidate servers to a trusted computing attestation service, where the request for attesting trusted computing environments includes the registration information of candidate servers, so that the trusted computing attestation service attestes trusted computing environments of the candidate servers; and selecting the target server from candidate servers passed through the attestation.

The technical solution provided by the present embodiment of the disclosure, sends the server selection request to the blockchain node, and selects the target server based on the registration information of candidate servers returned by the blockchain node, lay a foundation for subsequently sending business data to the target server, so that the target server performs the multi-party computation based on the business data.

Figure 2:
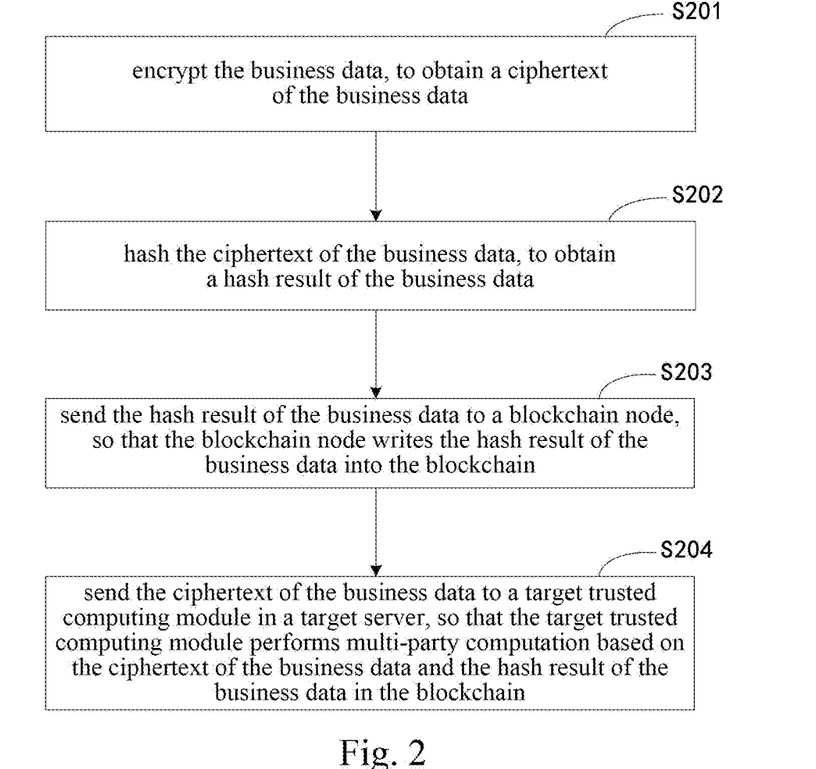
FIG. 2 is a schematic flowchart of a method for blockchain-based multi-party computation according to an embodiment of the present disclosure.

It can be known from the above description, that a participant device in the present embodiment of the disclosure sends the server selection request to the blockchain node in the blockchain network, and selects the target server based on the registration information of candidate servers returned by the blockchain node. After the target server is selected, the present embodiment of the disclosure may perform multi-party computation based on the selected target server. With reference to FIG. 2, the following describes, in the method for blockchain-based multi-party computation provided by the present embodiment of the disclosure, the process of multi-party computation based on the business data sent from the participant device.

As shown in FIG. 2, the method may include:

S201, encrypting business data, to obtain a ciphertext of the business data.

In the present embodiment of the disclosure, the business data is determined according to the enterprise business operation. That is, different businesses correspond to different business data. For example, if the business is software research and development, the business data is research and development data, etc.

Since the blockchain has the feature of broadcasting block information across the entire network, it is easy to cause data leakage when the participant device needs to perform private business data computation. In this regard, the present embodiment of the present disclosure may encrypt the business data to avoid data leakage.

As an example, the participant device may use a key to encrypt the business data to obtain the ciphertext of the business data. The key may be a blockchain private key of the participant device in the blockchain network.

However, a target trusted computing module in the target server does not know which key is used by the participant to encrypt the business data, so that it cannot decrypt the ciphertext of the business data, and cannot further acquire the business data.

In this regard, in an embodiment of the present disclosure, before encrypting the business data, the participant device first performs key interaction with the target trusted computing module in the target server, so that the target trusted computing module knows which key is used by the participant device to encrypt the business data. Therefore, the ciphertext of the business data is decrypted using the corresponding key to obtain the business data.

In an implementation, the participant device may send a key interaction request to the target trusted computing module in the target server, to negotiate with the target trusted computing module to determine a target random number. After the target random number is determined, the participant device uses the target random number to encrypt its own blockchain public key to obtain a ciphertext of the blockchain public key. Then, the ciphertext of the blockchain public key is sent to the target trusted computing module, so that the target trusted computing module uses the target random number to decrypt the received ciphertext of the blockchain public key to obtain the blockchain public key, so that a consensus is reached on the key between the participant device and the target trusted computing module.

Here, determining the target random number may include: after the target trusted computing module receives the key interaction request sent by the participant device, the target trusted computing module sends N random numbers to the participant device through a target untrusted worker in the target server (the target worker also knows these N random numbers); Here, the target trusted computing module still retains M random numbers, and these M random numbers are associated with the N random numbers; After the participant device receives the N random numbers sent from the target trusted computing module, it may derive the M random numbers based on the N random numbers according to preset rules, so that the M random numbers and the N random numbers are used together as the target random number, while the target worker does not know the M random numbers.

That is, the target random number is only known to the participant device and the target trusted computing module, and the target worker in the target server does not know the target random number, so that subsequent data leakage may not occur.

That is, in the embodiment of the present disclosure, before encrypting the business data to obtain the ciphertext of the business data, the method further includes: determining a target random number by interacting with the target trusted computing module; encrypting a key using the target random number to obtain a key ciphertext; sending the key ciphertext to the target trusted computing module, so that the target trusted computing module decrypts the key ciphertext using the target random number to obtain the key.

S202, hashing the ciphertext of the business data to obtain a hash result of the business data.

As an example, after obtaining the ciphertext of the business data, the participant device may hash the ciphertext of the business data to obtain the hash result of the business data, to lay a foundation for subsequent attestation of whether the ciphertext of the business data has been tampered.

S203, sending the hash result of the business data to a blockchain node, so that the blockchain node writes the hash result of the business data into the blockchain.

The hash result of the business data is sent to the blockchain node, so that the blockchain node writes the hash result of the business data into the blockchain to realize the storage and proof of the business data.

S204, sending the ciphertext of the business data to a target trusted computing module in a target server, so that the target trusted computing module performs multi-party computation based on the ciphertext of the business data and the hash result of the business data in the blockchain.

Alternatively, after the target trusted computing module in the target server receives the ciphertext of the business data, the target trusted computing module may decrypt the ciphertext of the business data based on the key acquired from the participant device to obtain the business data. In addition, the target trusted computing module may also query from the blockchain the hash result of the business data of the participant device which interacts with the trusted computing module based on the obtained business data, and then use the queried hash result of the business data to perform verification on the business data, to determine whether the business data has been tampered. If the verification is approved, it means that the business data has not been tampered. In this regard, the target trusted computing module may perform multi-party computation based on the obtained business data to obtain a multi-party computation result.

Further, after the participant device sends the ciphertext of the business data to the target trusted computing module in the target server, the method further includes: acquiring a ciphertext of the multi-party computation result from the target trusted computing module, where the ciphertext of the multi-party computation result is obtained by encrypting the multi-party computation result using the target random number; and decrypting the ciphertext of the multi-party computation result using the target random number to obtain the multi-party computation result.

That is, the embodiment of the present disclosure uses the target random number to encrypt the key, which may prevent the key from being leaked, and after the target trusted computing module performs multi-party computation based on the business data to obtain the multi-party computation result, the target random number may be used to encrypt the multi-party computation result to avoid leakage of the multi-party computation result, thereby improving the safety and reliability of the data.

The method for blockchain-based multi-party computation provided by the embodiment of the present disclosure, encrypts the business data, hashes the ciphertext of the business data which is obtained by the encryption, to obtain the hash result of the business data, then sends the hash result of the business data to the blockchain node, so that the blockchain node writes the hash result of the business data into the blockchain, and sends the ciphertext of the business data to the target trusted computing module in the target server, so that the target trusted computing module performs multi-party computation based on the ciphertext of the business data and the hash result of the business data in the blockchain. Therefore, by providing a solution that takes into account the safety and reliability of multi-party computation data, a circumstances is provided for ensuring the safety and reliability of the data.

The following takes a server as the executing body as an example to describe the method for the blockchain-based multi-party computation disclosed in the embodiment of the present disclosure.

Figure 3:
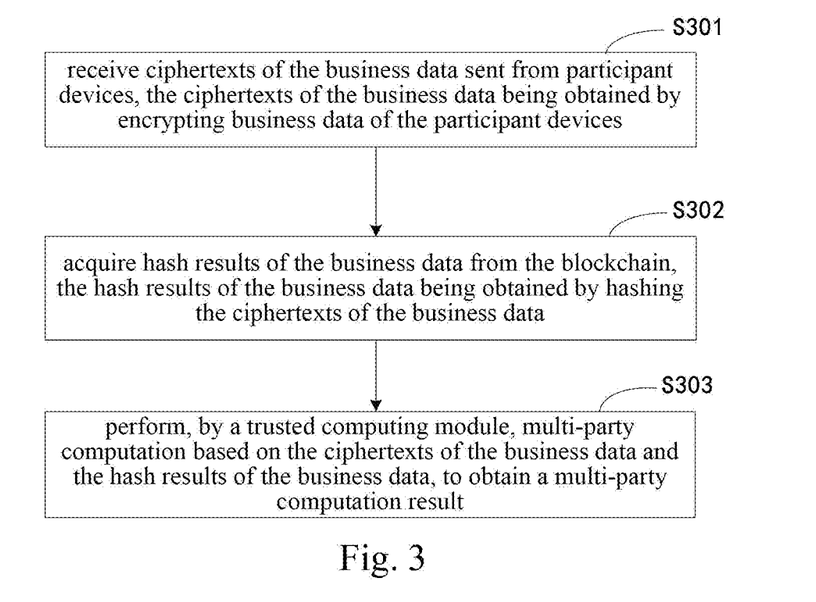
FIG. 3 is a schematic flowchart of another method for blockchain-based multi-party computation according to an embodiment of the present disclosure.

FIG. 3 is a schematic flowchart of another method for the blockchain-based multi-party computation according to an embodiment of the present disclosure. The method for blockchain-based multi-party computation according to an embodiment of the present disclosure may be performed by an apparatus for blockchain-based multi-party computation, which may be implemented by software and/or hardware, and may be configured in a server. The method includes the following steps:

S301, receiving ciphertexts of the business data sent from participant devices, the ciphertexts of the business data being obtained by encrypting business data of the participant devices.

Before performing S301, the server sends server registration information to a blockchain node, where the server registration information includes information of a trusted computing algorithm supported by the server, so that the blockchain node writes the server registration information into the blockchain, laying a foundation for the subsequent participant device selecting a target server.

S302, acquiring hash results of the business data from the blockchain, the hash results of the business data being obtained by hashing the ciphertexts of the business data.

S303, performing, by a trusted computing module, multi-party computation based on the ciphertexts of the business data and the hash results of the business data, to obtain a multi-party computation result.

As an example, after the server receives a ciphertext of the business data sent from the participant device, decrypts, by the trusted computing module, the ciphertext of the business data based on a key acquired from the participant device, to obtain the business data. Then, the server queries the hash result of the business data of the participant device from the blockchain based on the business data. Then, the server uses the queried hash result of the business data to perform attestation on the business data, to determine whether the business data has been tampered. If the business data passed the attestation, it means that the business data has not been tampered. In this regard, the trusted computing module in the server may perform multi-party computation based on the received business data to obtain a multi-party computation result.

Here, when multi-party computation is performed based on the business data using the trusted computing module, to obtain the multi-party computation result, the computation is specifically performed according to the target trusted computing algorithm required by the participant devices.

It should be noted that, in the embodiment of the present disclosure, before decrypting a ciphertext of the business data to obtain the business data using the trusted computing module, the method further includes: determining a target random number based on the interaction between the trusted computing module and the participant devices; acquiring a key ciphertext from the participant device, where the key ciphertext is obtained by encrypting a key using the target random number; decrypting, by the trusted computing module, the key ciphertext using the target random number to obtain the key; and correspondingly, the decrypting, by the trusted computing module, the ciphertext of the business data to obtain the business data, includes: decrypting, by the trusted computing module, the ciphertext of the business data using the key to obtain the business data.

The above described acquisition of the key is similar to the scheme of the acquisition of the key in embodiments of the method for blockchain-based multi-party computation applied to the participant device. For details, reference may be made to the foregoing embodiment, and detailed description thereof will be omitted.

The method for blockchain-based multi-party computation provided by the present embodiment of the disclosure, receives the ciphertexts of the business data sent from the participant devices, and acquires the hash results of the business data from the blockchain, then performs multi-party computation by the trusted computing module, based on the ciphertexts of the business data and the hash results of the business data, to obtain the multi-party computation result. Therefore, by providing a solution that takes into account the safety and reliability of multi-party computation data, a foundation is provided for ensuring the safety and reliability of the data.

In another implementation situation, after the server performs, by the trusted computing module, multi-party computation based on the ciphertexts of the business data and the hash results of the business data to obtain the multi-party computation result, the server may also send the multi-party computation result to the participant devices, so that the participant devices obtain the multi-party computation result. The above situation in the method for blockchain-based multi-party computation provided by the embodiment of the present disclosure will be described below with reference to FIG. 4.

Figure 4:
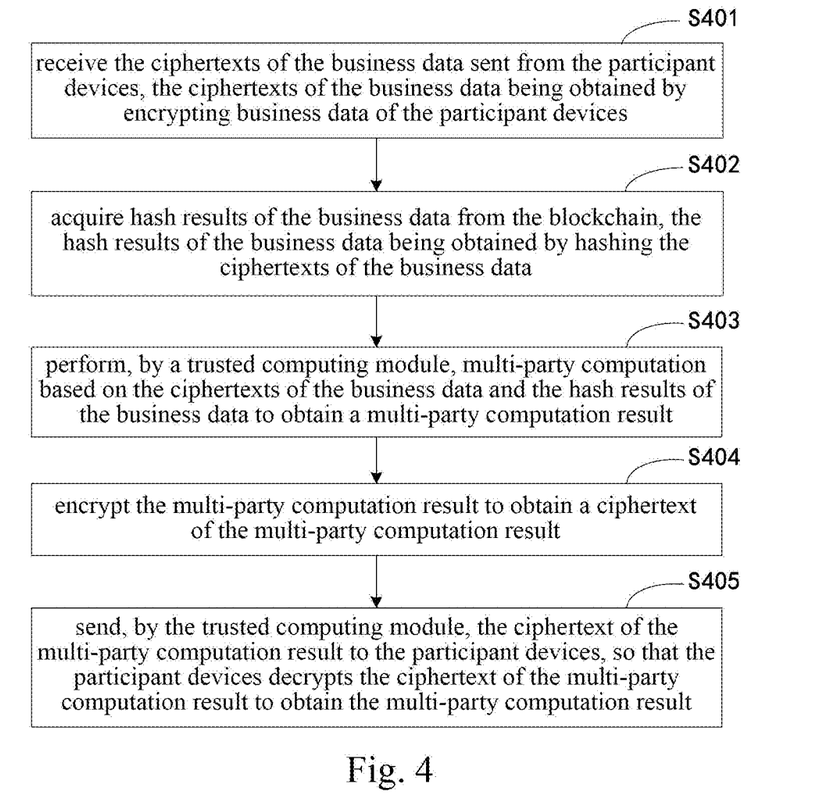
FIG. 4 is a schematic flowchart of yet another method for blockchain-based multi-party computation according to an embodiment of the present disclosure.

As shown in FIG. 4, the method may include:

S401, receiving the ciphertexts of the business data sent from the participant devices, the ciphertexts of the business data being obtained by encrypting business data of the participant devices.

S402, acquiring hash results of the business data from the blockchain, the hash results of the business data being obtained by hashing the ciphertexts of the business data.

S403, performing, by a trusted computing module, multi-party computation based on the ciphertexts of the business data and the hash results of the business data to obtain a multi-party computation result.

S404, encrypting the multi-party computation result to obtain a ciphertext of the multi-party computation result.

Here, the multi-party computation result is encrypted using a target random number determined by negotiating with the participant devices, to obtain the ciphertext of the multi-party computation result.

S405, sending, by the trusted computing module, the ciphertext of the multi-party computation result to the participant devices, so that the participant devices decrypts the ciphertext of the multi-party computation result to obtain the multi-party computation result.

As an example, the ciphertext of the multi-party computation result is sent to the participant devices, so that after receiving the ciphertext of the multi-party computation result, the participant devices decrypt the ciphertext of the multi-party computation result based on the target random number, to obtain the multi-party computation result, thereby effectively preventing leakage of the multi-party computation result.

The method for multi-party computation based on blockchain provided by the embodiment of the present disclosure, performs, by the trusted computing module, multi-party computation based on the ciphertexts of the business data and the hash results of the business data. After obtaining the multi-party computation result, the target random number determined by negotiating with the participant devices is used to encrypt the multi-party computation result to obtain the ciphertext of the multi-party computation result, and the ciphertext of the multi-party computation result is sent to the participant devices, so that the participant devices decrypt the ciphertext of the multi-party computation result using the target random number to obtain the multi-party computation result, thereby effectively preventing leakage of the multi-party computation result and improving data safety.

The following takes the executing body as a blockchain node as an example to describe the method for blockchain-based multi-party computation disclosed in an embodiment of the present disclosure.

Figure 5:
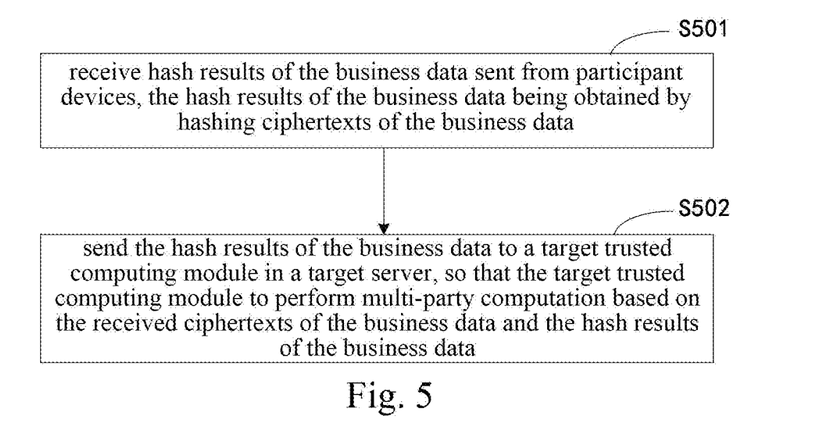
FIG. 5 is a schematic flowchart of yet another method for blockchain-based multi-party computation according to an embodiment of the present disclosure.

FIG. 5 is a schematic flowchart of yet another method for blockchain-based multi-party computation according to an embodiment of the present disclosure. The method for blockchain-based multi-party computation according to an embodiment of the present disclosure may be performed by an apparatus for blockchain-based multi-party computation, which may be implemented by software and/or hardware, and may be configured in a blockchain node. The method includes the following steps:

S501, receiving hash results of the business data sent from participant devices, the hash results of the business data being obtained by hashing ciphertexts of the business data.

Before performing S501, at least two servers may send server registration information to the blockchain to realize registration. Here, the server registration information includes the server's network address, a blockchain public key and trusted computing algorithm information supported by the server, etc. When receiving the server registration information sent from the at least two servers, the blockchain node writes the server registration information into the blockchain to lay a foundation for subsequent provision of candidate servers to the participant device.

Furthermore, when server selection requests sent from the participant devices are acquired, candidate servers supporting the target trusted computing algorithm may be queried from the blockchain, and registration information of the candidate servers may be acquired. Then, the registration information of candidate servers is sent to the participant devices, so that the participant devices select a target server from the candidate servers based on the registration information of candidate servers.

It should be noted that, for the implementation process of the participant devices selecting the target server from the candidate servers, reference may be made to the foregoing embodiment of the method for blockchain-based multi-party computation applied to a participant device, and detailed description thereof will be omitted.

As an example, in the embodiment of the present disclosure, the blockchain node receives the hash results of the business data sent from the participant devices, and writes the hash results of the business data into the blockchain, to perform storage and attestation on the business data.

S502, sending the hash results of the business data to a target trusted computing module in a target server, so that the target trusted computing module to perform multi-party computation based on the received ciphertexts of the business data and the hash results of the business data.

After receiving the ciphertexts of the business data sent from the participant devices, the target server decrypts the ciphertexts of the business data through the trusted computing module based on keys acquired from the participant devices, to obtain the business data. Then, based on the business data, the target server sends to the blockchain a request for acquiring the hash results of the business data, so that the blockchain node sends the hash results of the business data to the target server. Then, the target server uses the queried hash results of the business data to perform verification on the business data to determine whether the business data has been tampered. If the business data passed the verification, it means that the business data has not been tampered. In this regard, the trusted computing module in the server may perform multi-party computation based on the received business data to obtain a multi-party computation result.

The method for blockchain-based multi-party computation provided by the embodiment of the present disclosure, receives the hash results of the business data sent from the participant devices, and sends the hash results of the business data to the target trusted computing module in the target server, so that the target trusted computing module performs multi-party computation based on the received ciphertexts of the business data and the hash results of the business data. Therefore, by providing a solution that takes into account the safety and reliability of multi-party computation data, a foundation is provided for ensuring the safety and reliability of the data.

Figure 6:
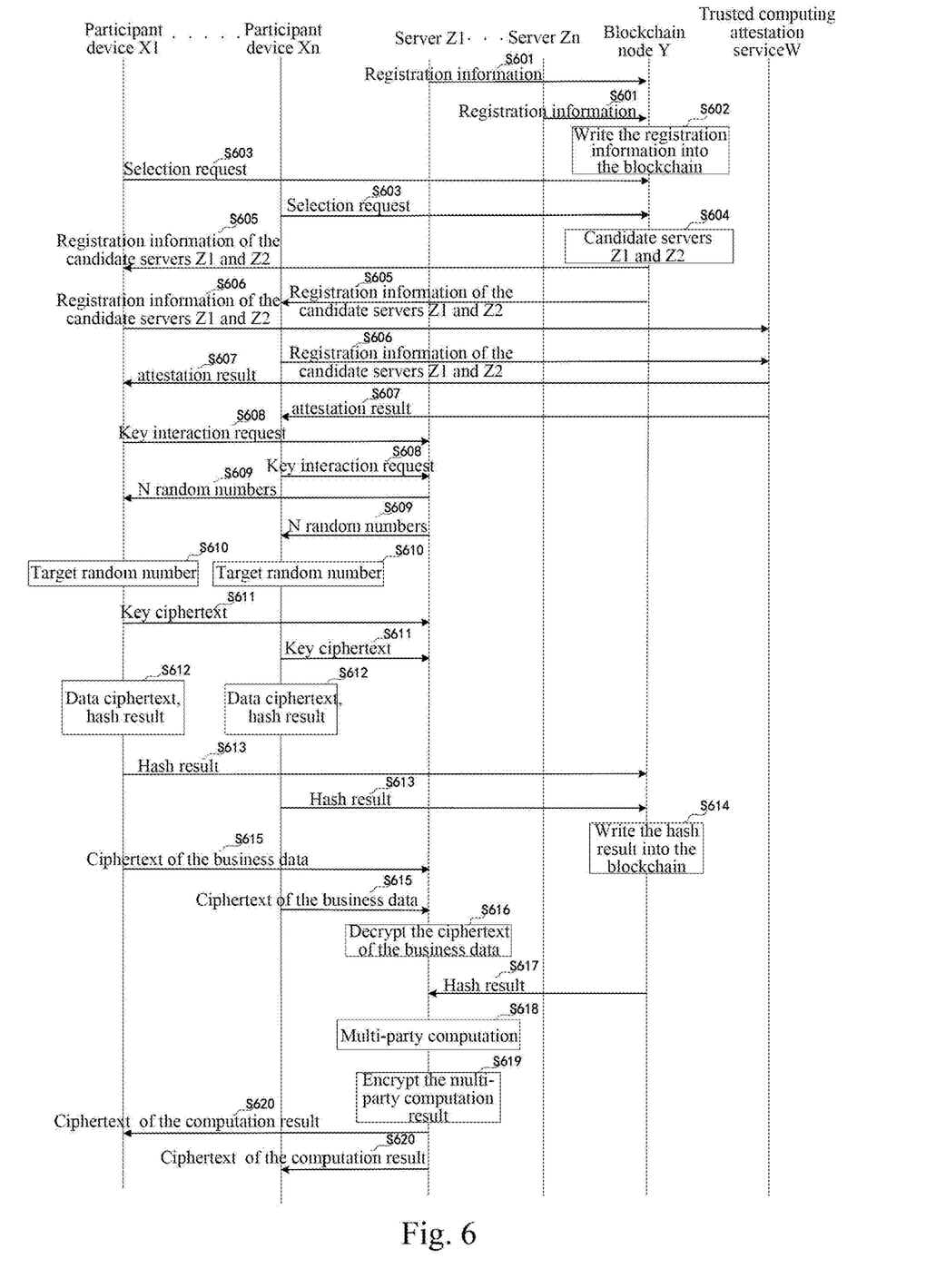
FIG. 6 is a schematic diagram of signaling interaction between a participant device, a blockchain node, and a server according to an embodiment of the present disclosure.

In the following description, an embodiment of the method for blockchain-based multi-party computation in foregoing embodiments is described in detail. For details, reference may be made to FIG. 6. FIG. 6 is a schematic diagram of signaling interaction between a participant device, a blockchain node, and a server according to an embodiment of the present disclosure.

Assuming that in the present embodiment, there are X participating devices, respectively X1, X2, . . . Xn; the blockchain node is Y, and there are Z servers, respectively Z1, Z2, . . . Zn, then the interaction process between the participant devices, the blockchain node and the servers is as follows:

S601, the servers Z1, Z2, . . . Zn send server registration information to the blockchain node Y.

The server registration information includes information of the trusted computing algorithm supported by the server.

S602, the blockchain node Y writes the received server registration information into the blockchain.

S603, the participant devices X1, X2, . . . Xn send server selection requests to the blockchain node Y.

A server selection request includes information of a target trusted computing algorithm required by a participant device.

S604, the blockchain node Y queries candidate servers Z1 and Z2 supporting the target trusted computing algorithm from the blockchain based on the information of the target trusted computing algorithm required by the participant devices.

S605, the blockchain node Y sends registration information of the candidate servers Z1 and Z2 to the participant devices X1, X2, . . . Xn.

S606, the participant devices X1, X2, . . . Xn send the registration information of the candidate servers Z1 and Z2 to a trusted computing attestation service W.

S607, the participant devices X1, X2, . . . Xn receive an attestation result fed back by the trusted computing attestation service W, and select the candidate server Z1 passed through the attestation as a target server.

S608, the participant devices X1, X2, . . . Xn send key interaction requests to the target server Z1.

S609, the target server Z1 sends N random numbers respectively to the participant devices X1, X2, ... Xn based on the received key interaction requests.

S610, the participant devices X1, X2, ... Xn derive M random numbers based on the received N random numbers, so as to obtain a target random number based on the M random numbers and the N random numbers.

S611, the participant devices X1, X2, ... Xn respectively use the target random number to encrypt their respective keys to obtain key ciphertexts, and send the key ciphertexts to the target server Z1.

S612, the participant devices X1, X2, ... Xn encrypt business data to obtain ciphertexts of the business data, and hash the ciphertexts of the business data to obtain hash results of the business data.

S613, the participant devices X1, X2, ... Xn send the hash results of the business data to the blockchain node Y, so that the blockchain node Y writes the hash results of the business data into the blockchain.

S614, the blockchain node Y writes the received hash results of the business data into the blockchain.

S615, the participant devices X1, X2, ... Xn respectively send their respective ciphertext of the business data to the target server Z1.

S616, the target server Z1 uses keys sent by the participant devices X1, X2, ... Xn to decrypt the received ciphertexts of the business data to obtain the business data.

There are at least two piece of business data.

S617, the target server Z1 acquires a hash result of the business data corresponding to each business data from the blockchain based on the business data, for performing attestation.

S618, if the business data passes through the attestation, the target server Z1 performs multi-party computation based on the business data sent from the participant devices X1, X2, ... Xn, to obtain a multi-party computation result.

S619, the target server Z1 encrypts the multi-party computation result using the target random number to obtain a ciphertext of the multi-party computation result.

S620, the target server Z1 sends the ciphertext of the multi-party computation result to the participant devices X1, X2, ... Xn, so that the participant devices X1, X2, ... Xn decrypt the ciphertext of the multi-party computation result using the target random number, to obtain the multi-party computation result.

The method for multi-party computation based on blockchain provided by the foregoing embodiment, provides a foundation for ensuring the safety and reliability of the data by providing a solution that takes into account the safety and reliability of multi-party computation data.

Figure 7:
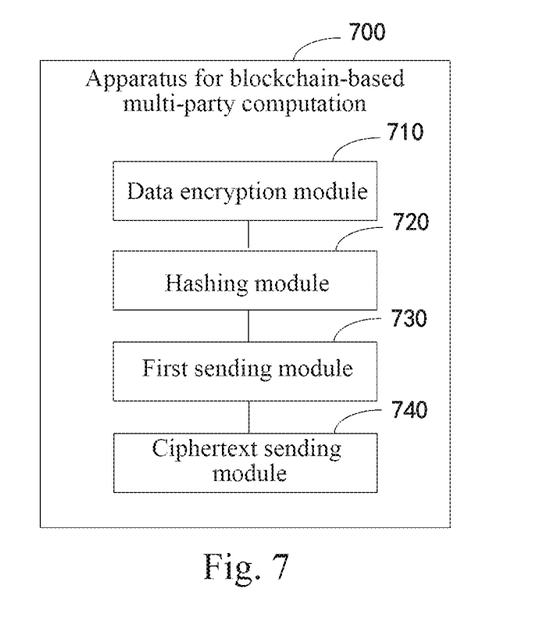
FIG. 7 is a schematic structural diagram of an apparatus for blockchain-based multi-party computation according to an embodiment of the present disclosure.

FIG. 7 is a schematic structural diagram of an apparatus for multi-party computation according to an embodiment of the present disclosure. The apparatus for blockchain-based multi-party computation may be implemented in software and/or hardware and configured in a participant device. As shown in FIG. 7, the apparatus 700 for blockchain-based multi-party computation disclosed in the present embodiment includes a data encryption module 710, a hashing module 720, a first sending module 730, and a ciphertext sending module 740, in which:

the data encryption module 710, configured to encrypt business data to obtain a ciphertext of the business data;

the hashing module 720, configured to hash the ciphertext of the business data to obtain a hash result of the business data;

the first sending module 730, configured to send the hash result of the business data to a blockchain node, so that the blockchain node writes the hash result of the business data into a blockchain; and the ciphertext sending module 740, configured to send the ciphertext of the business data to a target trusted computing module in a target server, so that the target trusted computing module performs multi-party computation based on the ciphertext of the business data and the hash result of the business data in the blockchain.

As an alternative implementation form of the present disclosure, the apparatus 700 further includes: a first determination module, a key encryption module and a third sending module:

the first determination module, configured to determine a target random number by interacting with the target trusted computing module;

the key encryption module, configured to encrypt a key using the target random number, to obtain a key ciphertext;

the third sending module, configured to send the key ciphertext to the target trusted computing module, so that the target trusted computing module decrypts the key ciphertext using the target random number to obtain the key; and correspondingly, the data encryption module 710, is specifically configured to:

encrypt the business data using the key to obtain the ciphertext of the business data.

As an alternative implementation form of the present disclosure, the apparatus 700 further includes: a request sending module, an information acquisition module and a selection module:

the request sending module, configured to send a server selection request to the blockchain node, where the server selection request comprises information of a target trusted computing algorithm;

the information acquisition module, configured to acquire, from the blockchain node, registration information of candidate servers supporting the target trusted computing algorithm; and the selection module, configured to select the target server from the candidate servers, based on the registration information of the candidate servers.

As an alternative implementation form of the present disclosure, the selection module is specifically configured to:

send a request for attesting trusted computing environments of the candidate servers to a trusted computing attestation service, where the request for attesting the trusted computing environments comprises the registration information of the candidate servers, so that the trusted computing attestation service performs attestation on the trusted computing environments of the candidate servers; and select the target server from candidate servers passed through the attestation.

As an alternative implementation form of the present disclosure, the apparatus 700 further includes: a result ciphertext acquisition module and a result ciphertext decryption module:

the result ciphertext acquisition module, configured to acquire a ciphertext of a multi-party computation result from the target trusted computing module, where the ciphertext of the multi-party computation result is acquired by encrypting the multi-party computation result using the target random number; and the result ciphertext decryption module, configured to decrypt the ciphertext of the multi-party computation result using the target random number, to acquire the multi-party computation result.

It should be noted that the foregoing description of the embodiment of the method for blockchain-based multi-party computation applied to a participant device is also applicable to the apparatus for multi-party computation based on blockchain of the present embodiment. The implementation principles are similar, and detailed description thereof will be omitted.

The apparatus for multi-party computation based on blockchain provided by the present embodiment of the disclosure, encrypts the business data, hashes the ciphertext of the business data obtained by encryption to obtain the hash result of the business data, then sends the hash result of the business data to the blockchain node, so that the blockchain node writes the hash result of the business data into the blockchain, and sends the ciphertext of the business data to the target trusted computing module in the target server, so that the target trusted computing module performs multi-party computation based on the ciphertext of the business data and the hash result of the business data in the blockchain. Therefore, by providing a solution that takes into account the safety and reliability of multi-party computation data, a condition is provided for ensuring the safety and reliability of the data.

Figure 8:
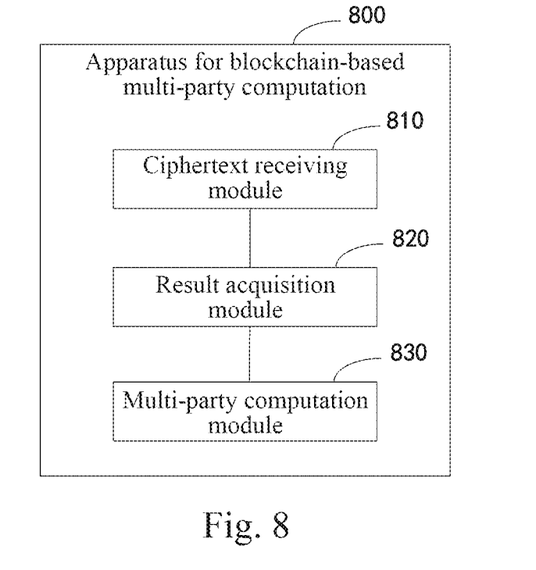
FIG. 8 is a schematic structural diagram of another apparatus for blockchain-based multi-party computation according to an embodiment of the present disclosure.

FIG. 8 is a schematic structural diagram of another apparatus for blockchain-based multi-party computation according to an embodiment of the present disclosure. The apparatus for blockchain-based multi-party computation may be implemented in software and/or hardware and configured in a server. As shown in FIG. 8, the apparatus 800 for blockchain-based multi-party computation disclosed in the present embodiment may include a ciphertext receiving module 810, a result acquisition module 820 and a multi-party computation module 830, in which:

the ciphertext receiving module 810, configured to receive ciphertexts of business data sent from participant devices, the ciphertexts of the business data being obtained by encrypting the business data of the participant devices;

the result acquisition module 820, configured to acquire hash results of the business data from the blockchain, the hash results of the business data being obtained by hashing the ciphertexts of the business data; and the multi-party computation module 830, configured to perform multi-party computation by a trusted computing module, based on the ciphertexts of the business data and the hash results of the business data to obtain a multi-party computation result.

As an alternative implementation of the present disclosure, the multi-party computation module 830 includes: a data decryption unit and a data attestation unit:

the data decryption unit, configured to decrypt, by the trusted computing module, the ciphertexts of the business data to obtain the business data; and the data attestation unit, configured to attest the business data based on the hash results of the business data.

As an alternative implementation form of the present disclosure, the multi-party computation module 830 further includes: a second determination unit, a ciphertext acquisition unit, and a data decryption unit:

the second determination unit, configured to determine a target random number, based on an interaction between the trusted computing module and the participant devices;

the ciphertext acquisition unit, configured to acquire key ciphertexts from the participant device, where the key ciphertexts are obtained by encrypting keys using the target random number;

the key decryption unit, configured to decrypt, by the trusted computing module, the key ciphertexts using the target random number, to obtain the keys.

correspondingly, the data decryption unit, is specifically configured to:

decrypt, by the trusted computing module, the ciphertexts of the business data using the keys to obtain the business data.

As an alternative implementation of the present disclosure, the apparatus 800 further includes: a result encryption module and a result ciphertext sending module:

the result encryption module, configured to encrypt the multi-party computation result, to obtain a ciphertext of the multi-party computation result; and the result ciphertext sending module, configured to send, by the trusted computing module, the ciphertext of the multi-party computation result to the participant devices, so that the participant devices decrypts the ciphertext of the multi-party computation result to obtain the multi-party computation result.

As an alternative implementation form of the present disclosure, the apparatus 800 further includes: a fourth sending module:

the fourth sending module, configured to send registration information of a server to a blockchain node, wherein the registration information of the server comprises information of a trusted computing algorithm supported by the server, so that the blockchain node writes the registration information of the server into the blockchain.

It should be noted that the foregoing description of embodiments of the method for blockchain-based multi-party computation applied to a server is also applicable to the apparatus for blockchain-based multi-party computation of the present embodiment. The implementation principles are similar, and detailed description thereof will be omitted.

The apparatus for blockchain-based multi-party computation provided by the embodiment of the present disclosure, receives the ciphertexts of the business data sent from the participant devices, and acquires the hash results of the business data from the blockchain, then performs multi-party computation using the trusted computing module, based on the ciphertexts of the business data and the hash results of the business data to obtain the multi-party computation result. Therefore, by providing a solution that takes into account the safety and reliability of multi-party computation data, a foundation is provided for ensuring the safety and reliability of the data.

Figure 9:
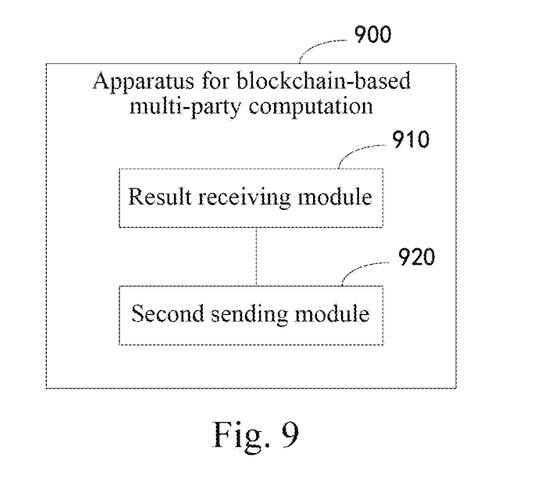
FIG. 9 is a schematic structural diagram of yet another apparatus for blockchain-based multi-party computation according to an embodiment of the present disclosure.

FIG. 9 is a schematic structural diagram of yet another apparatus for blockchain-based multi-party computation according to an embodiment of the present disclosure. The apparatus for blockchain-based multi-party computation may be implemented in software and/or hardware and configured in a blockchain node. As shown in FIG. 9, the apparatus 900 for blockchain-based multi-party computation disclosed in the present embodiment includes a result receiving module 910 and a second sending module 920, in which:

the result receiving module 910, configured to receive hash results of business data sent from participant devices, the hash results of the business data being obtained by hashing ciphertexts of the business data; and the second sending module 920, configured to send the hash results of the business data to a target trusted computing module in a target server, so that the target trusted computing module to perform multi-party computation based on the received ciphertexts of the business data and the hash results of the business data.

As an alternative implementation of the present disclosure, the apparatus 900 further includes: a registration information acquisition module and a registration information writing module:

the registration information acquisition module, configured to acquire server registration information from candidate servers, wherein the server registration information comprises information of trusted computing algorithms supported by the candidate servers; and the registration information writing module, configured to write the server registration information into the blockchain.

As an alternative implementation form of the present disclosure, the apparatus 900 further includes: a selection request acquisition module, a querying module and a fifth sending module:

the selection request acquisition module, configured to acquire server selection requests from the participant devices, wherein the server selection requests comprises information of a target trusted computing algorithm required by the participant devices;

the querying module, configured to query registration information of the candidate servers supporting the target trusted computing algorithm from the blockchain; and the fifth sending module, configured to send the registration information of the candidate servers to the participant devices, so that the participant devices selects the target server from the candidate servers based on the registration information of the candidate servers.

It should be noted that the foregoing description of the embodiment of the method for blockchain-based multi-party computation applied to a blockchain node is also applicable to the apparatus for blockchain-based multi-party computation of the present embodiment. The implementation principles are similar, and detailed description thereof will be omitted.

The apparatus for blockchain-based multi-party computation provided by the embodiment of the present disclosure, receives the hash results of the business data sent by the participant devices, and sends the hash results of the business data to the target trusted computing module in the target server, so that the target trusted computing module performs multi-party computation based on the received ciphertexts of the business data and the hash results of the business data. Therefore, by providing a solution that takes into account the safety and reliability of multi-party computation data, a foundation is provided for ensuring the safety and reliability of the data.

According to some embodiments of the present disclosure, the present disclosure further provides an electronic device and a readable storage medium.

Figure 10:
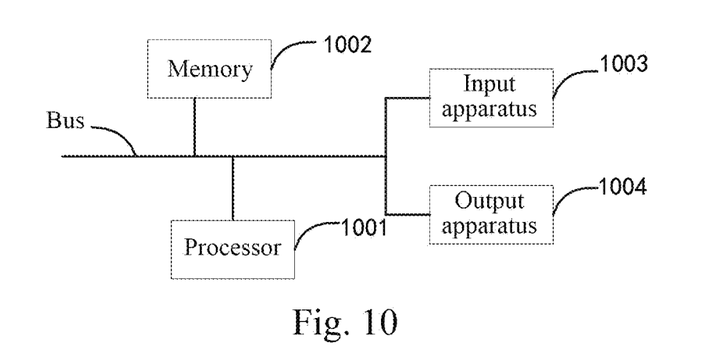
FIG. 10 is a schematic structural diagram of an electronic device according to an embodiment of the present disclosure.

As shown in FIG. 10, which is a block diagram of an electronic device of a method for blockchain-based multi-party computation according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 10, the electronic device includes: one or more processors 1001, a memory 1002, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 10, one processor 1001 is used as an example.

The memory 1002 is a non-transitory computer readable storage medium provided by the present disclosure. The memory stores instructions executable by at least one processor, so that the at least one processor performs the method for blockchain-based multi-party computation provided by the present disclosure. The non-transitory computer readable storage medium of the present disclosure stores computer instructions for causing a computer to perform the method for blockchain-based multi-party computation provided by the present disclosure.

The memory 1002, as a non-transitory computer readable storage medium, may be used to store non-transitory software programs, non-transitory computer executable programs and modules, such as program instructions/modules corresponding to the method for blockchain-based multi-party computation in embodiments of the present disclosure (for example, the data encryption module 710, the hashing module 720, and the first sending module 730 and ciphertext sending module 740 shown in FIG. 7). The processor 1001 executes the non-transitory software programs, instructions, and modules stored in the memory 1002 to execute various functional applications and data processing of the server, that is, to implement the methods for blockchain-based multi-party computation in the foregoing method embodiments.

The memory 1002 may include a storage program area and a storage data area, where the storage program area may store an operating system and at least one function required application program; and the storage data area may store data created by the use of the electronic device according to the method for blockchain-based multi-party computation, etc. In addition, the memory 1002 may include a high-speed random access memory, and may also include a non-transitory memory, such as at least one magnetic disk storage device, a flash memory device, or other non-transitory solid-state storage devices. In some embodiments, the memory 1002 may optionally include memories remotely provided with respect to the processor 1001, and these remote memories may be connected to the electronic device of the method for processing parking through a network. Examples of the above network include but are not limited to the Internet, intranet, local area network, mobile communication network, and combinations thereof.

The electronic device of the method for blockchain-based multi-party computation may further include: an input apparatus 1003 and an output apparatus 1004. The processor 1001, the memory 1002, the input apparatus 1003, and the output apparatus 1004 may be connected through a bus or in other methods. In FIG. 10, connection through a bus is used as an example.

The input apparatus 1003 may receive input digital or character information, and generate key signal inputs related to user settings and function control of the electronic device of the method for blockchain-based multi-party computation, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technical solution of embodiments of the present disclosure, by encrypting the business data, and hashing the ciphertext of the business data obtained by the encryption to obtain the hash result of the business data, and sending the hash result of the business data to a blockchain node, so that the blockchain node writes the hash result of the business data into the blockchain, and sending the ciphertext of the business data to the trusted computing module in the target server, so that the trusted computing module performs multi-party computation based on the ciphertext of the business data and the hash result of the business data in the blockchain. Therefore, by providing a solution that takes into account the safety and reliability of multi-party computation data, it provides a foundation for ensuring the safety and reliability of the data.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for blockchain-based multi-party computation, executed by a participant device, the method comprising:
   determining a target random number by interacting with a target trusted computing module;
   encrypting a key using the target random number, to obtain a key ciphertext;
   sending the key ciphertext to the target trusted computing module, so that the target trusted computing module decrypts the key ciphertext using the target random number to obtain the key;

encrypting business data using the key, to obtain a ciphertext of the business data;

hashing the ciphertext of the business data, to obtain a hash result of the business data;

sending the hash result of the business data to a blockchain node, so that the blockchain node writes the hash result of the business data into a blockchain; and sending the ciphertext of the business data to a target trusted computing module in a target server, so that the target trusted computing module performs multi-party computation based on the ciphertext of the business data and the hash result of the business data in the blockchain.

2. The method according to claim 1, wherein, before sending the ciphertext of the business data to the target trusted computing module in the target server, the method further comprises:

sending a server selection request to the blockchain node, wherein the server selection request comprises information of a target trusted computing algorithm;

acquiring, from the blockchain node, registration information of candidate servers supporting the target trusted computing algorithm; and selecting the target server from the candidate servers, based on the registration information of the candidate servers.

3. The method according to claim 2, wherein the selecting the target server from the candidate servers, based on the registration information of the candidate servers, comprises:

sending a request for attesting trusted computing environments of the candidate servers to a trusted computing attestation service, wherein the request for attesting the trusted computing environments comprises the registration information of the candidate servers, so that the trusted computing attestation service performs attestation on the trusted computing environments of the candidate servers; and selecting the target server from candidate servers passed through the attestation.

4. The method according to claim 1, wherein, after sending the ciphertext of the business data to the target trusted computing module in the target server, the method further comprises:

acquiring a ciphertext of a multi-party computation result from the target trusted computing module, wherein the ciphertext of the multi-party computation result is acquired by encrypting the multi-party computation result using the target random number; and decrypting the ciphertext of the multi-party computation result using the target random number, to acquire the multi-party computation result.

5. A method for blockchain-based multi-party computation, executed by a server, the method comprising:

receiving ciphertexts of business data sent from participant devices, the ciphertexts of the business data being obtained by encrypting the business data of the participant devices;

acquiring hash results of the business data from a blockchain, the hash results of the business data being obtained by hashing the ciphertexts of the business data; and performing multi-party computation by a trusted computing module, based on the ciphertexts of the business data and the hash results of the business data to obtain a multi-party computation result, comprising:

determining a target random number, based on an interaction between the trusted computing module and the participant devices;

acquiring key ciphertexts from the participant devices, wherein the key ciphertexts are obtained by encrypting keys using the target random number;

decrypting, by the trusted computing module, the key ciphertexts using the target random number, to obtain the keys;

decrypting, by the trusted computing module, the ciphertexts of the business data using the keys to obtain the business data; and attesting the business data based on the hash results of the business data.

6. The method according to claim 5, wherein, after obtaining the multi-party computation result, the method further comprises:

encrypting the multi-party computation result, to obtain a ciphertext of the multi-party computation result; and sending, by the trusted computing module, the ciphertext of the multi-party computation result to the participant devices, so that the participant devices decrypts the ciphertext of the multi-party computation result to obtain the multi-party computation result.

7. The method according to claim 5, wherein, before receiving the ciphertexts of the business data sent from the participant devices, the method further comprises:

sending registration information of a server to a blockchain node, wherein the registration information of the server comprises information of a trusted computing algorithm supported by the server, so that the blockchain node writes the registration information of the server into the blockchain.

8. An electronic device, comprising:

at least one processor; and a memory, communicatively connected to the at least one processor; wherein, the memory, storing instructions executable by the at least one processor, the instructions, when executed by the at least one processor, cause the at least one processor to perform the method for blockchain-based multi-party computation according to claim 1.

9. An electronic device, comprising:

at least one processor; and a memory, communicatively connected to the at least one processor; wherein, the memory, storing instructions executable by the at least one processor, the instructions, when executed by the at least one processor, cause the at least one processor to perform the method for blockchain-based multi-party computation according to claim 5.

10. A non-transitory computer readable storage medium, storing computer instructions, the computer instructions being used to cause a computer to perform the method for blockchain-based multi-party computation according to claim 1.

11. A non-transitory computer readable storage medium, storing computer instructions, the computer instructions being used to cause a computer to perform the method for blockchain-based multi-party computation according to claim 5.

* * * * *